W. J. MILLER.
GLASS MOLDING MACHINE.
APPLICATION FILED FEB. 23, 1909.
950,941.
Patented Mar. 1, 1910.
4 SHEETS—SHEET 3.
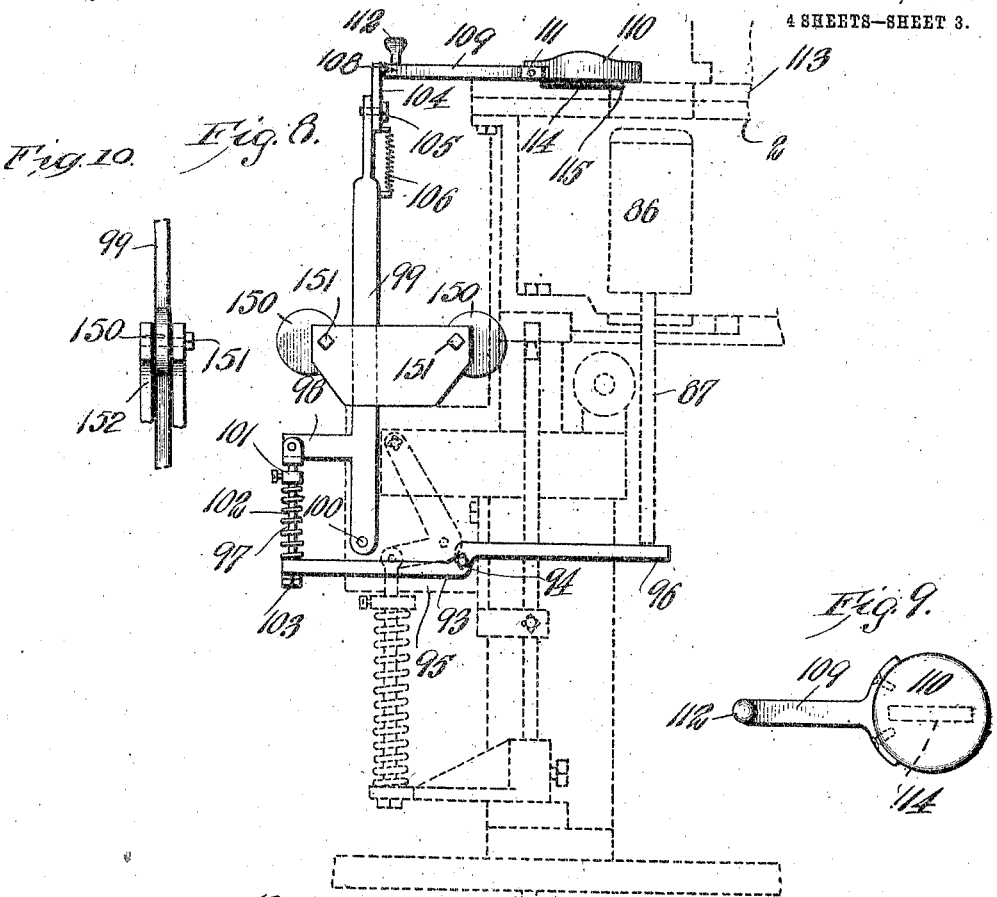
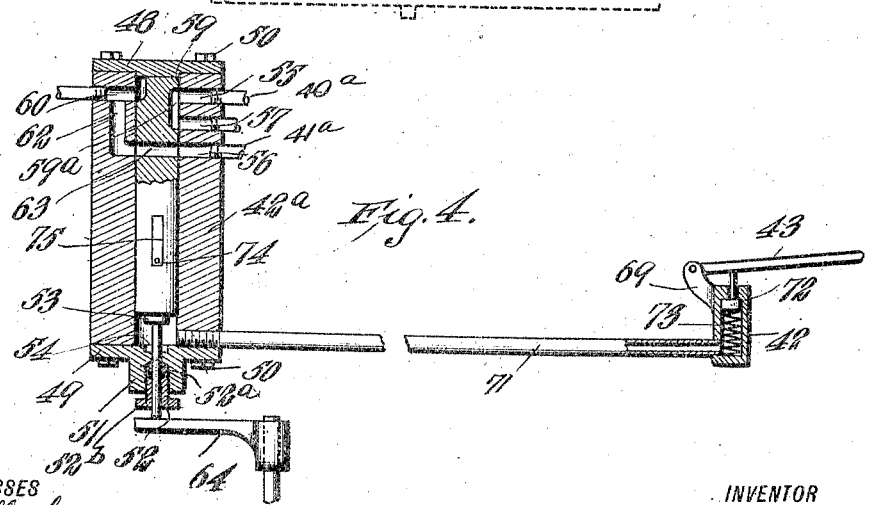
WITNESSES
INVENTOR
WILLIAM J. MILLER.
BY
ATTORNEYS

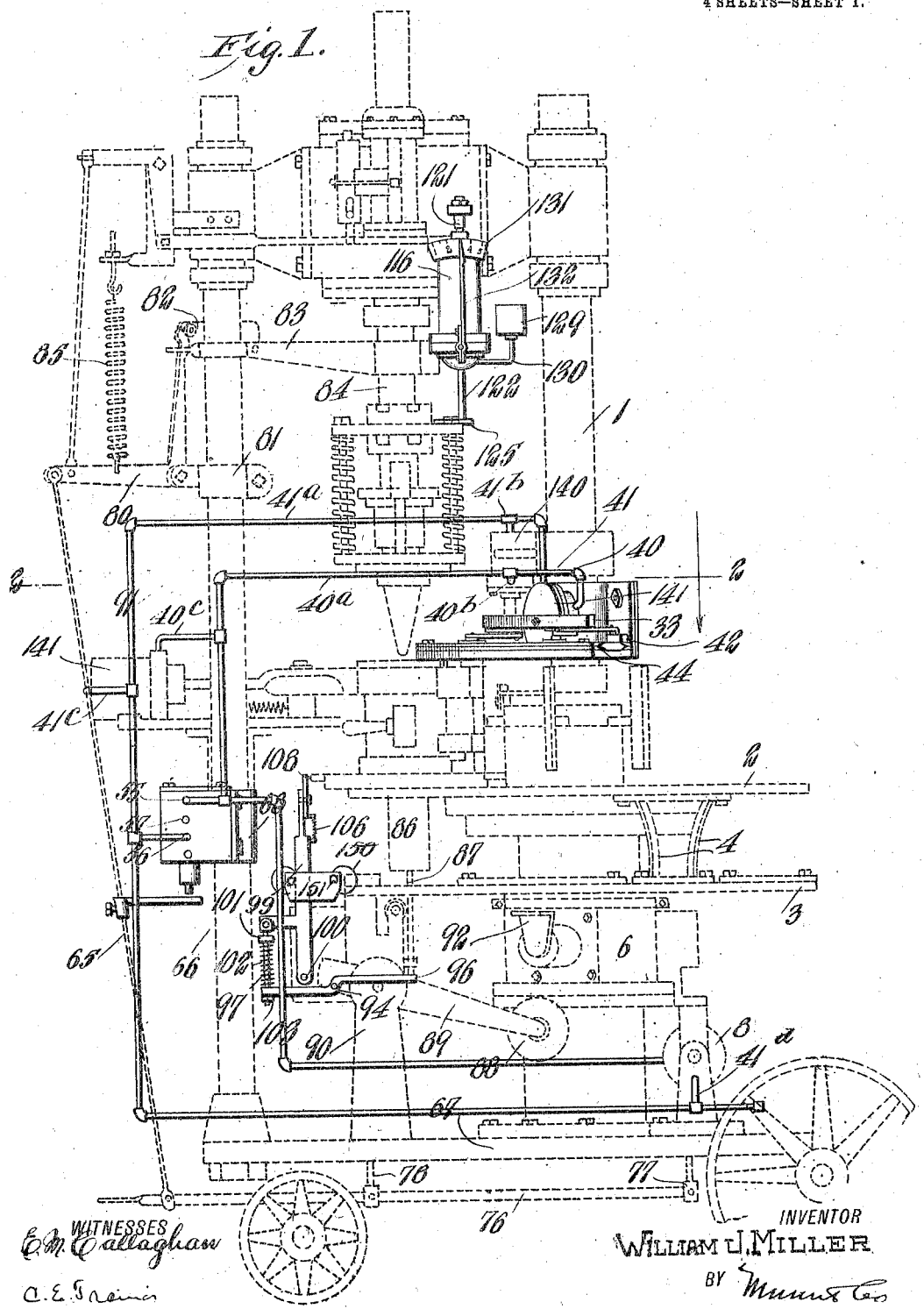

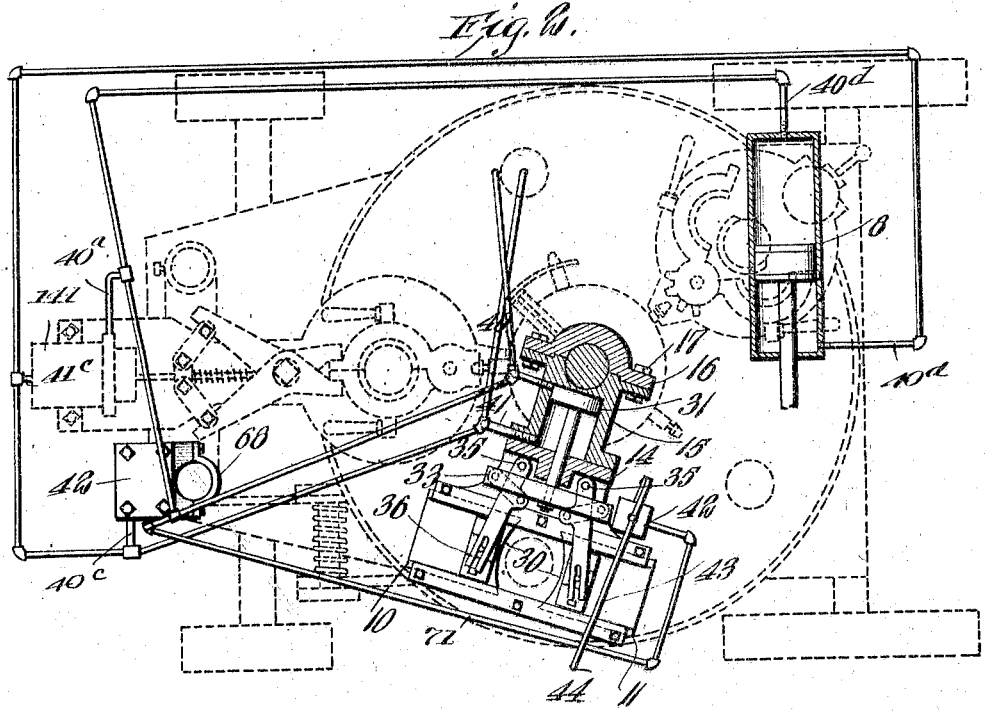

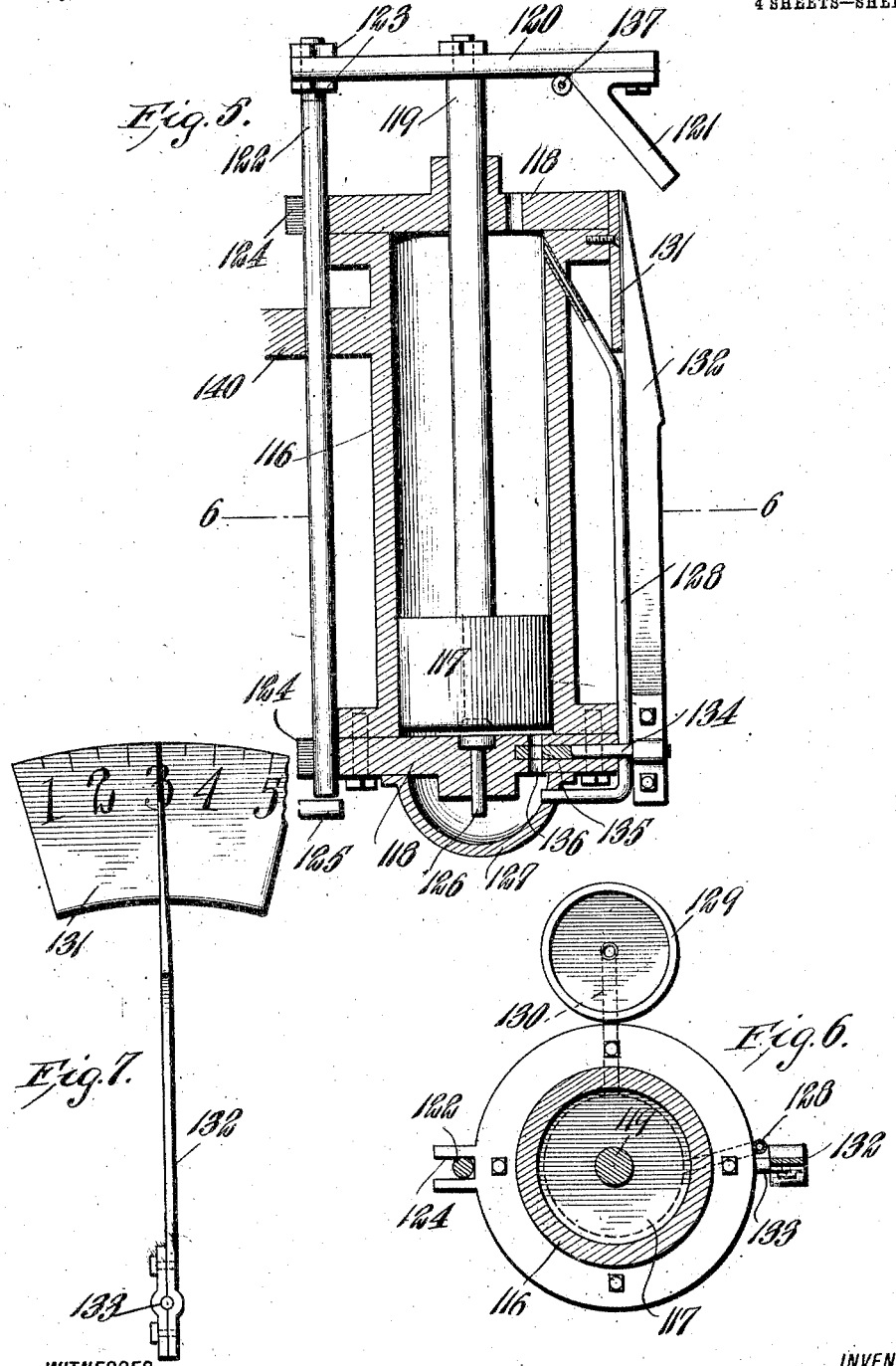
W. J. MILLER.
GLASS MOLDING MACHINE.
APPLICATION FILED FEB. 23, 1909.
950,941.
Patented Mar. 1, 1910.
4 SHEETS—SHEET 4.
WITNESSES
E. W. Callaghan
INVENTOR
WILLIAM J. MILLER
BY
ATTORNEYS

UNITED STATES PATENT OFFICE.

WILLIAM J. MILLER, OF COFFEYVILLE, KANSAS.

GLASS-MOLDING MACHINE.

950,941. Specification of Letters Patent. Patented Mar. 1, 1910.

Application filed February 23, 1909. Serial No. 479,516.

*To all whom it may concern:*

Be it known that I, WILLIAM J. MILLER, a citizen of the United States, and a resident of Coffeyville, in the county of Montgomery and State of Kansas, have invented certain new and useful Improvements in Glass-Molding Machines, of which the following is a specification.

My invention is an improvement in glass molding machines and consists in certain novel constructions and combinations of parts hereinafter described and claimed.

The object of the invention is to provide improvements which will convert semi-automatic machines of the type shown in Patent No. 787,050, of April 11, 1905, into practically automatic machines.

Referring to the drawings forming a part hereof—Figure 1 is a side view of a molding machine provided with the improvements, the novel features being shown in full lines; Fig. 2 is a section on the line 2—2 of Fig. 1; Fig. 3 is a longitudinal section of the shears; Fig. 4 is a longitudinal section through the valve which operates the shears; Fig. 5 is a longitudinal section of the timing device; Fig. 6 is a section on the line 6—6 of Fig. 5; Fig. 7 is a plan view of the scale and indicator; Fig. 8 is a side view of the device for shifting the bottoms, Fig. 9 is a plan view of the blowing bottom, and Fig. 10 is a partial plan view of the means for regulating the extent of movement of the lever.

The present embodiment of my invention consists in part of a pair of shears arranged at the charging position and adapted to cut off the glass as it is inserted into molds by the gatherer, the shears being actuated by the punty or pontil as the glass is placed in the mold.

The glass blowing machine shown consists of a column or spindle 1, on which is rotatably mounted a table which carries the blow molds and the primary bottoms. The table consists of an upper plate 2 carrying the blow molds, and a lower part or ring 3 carrying the primary bottoms, and the parts are secured together by means of brackets 4.

An intermittent rotary movement is imparted to the table by means of any suitable mechanism, connecting a sleeve 6 loosely encircling the spindle 1 below the ring 3, with the piston rod of an air cylinder 8.

In the construction shown, the table 2 is provided with five blow molds, one for charging, one for pressing, one for blowing, one for discharging, and one which is permitted to cool before charging, so that all of the operations above mentioned can take place simultaneously. It will be understood that each intermittent movement of the table carries a mold from one station to the next.

The shears as before stated, are at the charging position, and consists of a pair of blade carriages 10 and 11, which are movable toward and from each other in a guideway 12, arranged transversely of a bracket 13, which bracket projects from and is integral with the cylinder head 14 of a cylinder 15. The cylinder 15 is provided with an integral split bearing 16, which encircles the standard or spindle 1 before mentioned, the sections of the split bearing being secured together by bolts 17.

The guideway consists of a plate, a shoulder 19 being formed between the plate and the bracket, and longitudinally of the plate and spaced apart from each other, are arranged pairs of superimposed strips 20 and 21 whose inner adjacent edges are beveled as at 22, and the strips are secured to the plates by screws 23.

The blade carriages 10 and 11, have their edges beveled as at 24 to fit between the beveled edges of the strips, and each is provided in its upper surface with a depression 25, in which is received the blade 26, the blade being retained in place by a cross bar 27 secured to the carriage by screws 28, and provided with a pin 29 at its center for a purpose to be presently described. The meeting edges of the blades are preferably concave as shown at 30, and the blades overlap with a shearing action when moved together.

The cylinder 15 before mentioned is provided with a piston 31, and to the piston rod 32 thereof is connected a cross head 33. Levers 34 are pivoted to the bracket as at 35 adjacent to the cylinder, and the free ends of the levers are forked as at 36 and engage the pins 29 before mentioned. Each of the levers is provided with a lateral lug 37 and links 38 are pivoted to the cross head as at 39 and to the lugs 37.

It will be evident from the description, that when fluid under pressure is admitted to the cylinder behind the piston, the piston will be moved forward, thus moving forward the cross head which through the connection of the links with the levers will move the blades toward each other, while a reverse movement of the piston will move them in the opposite direction. Each end of the cylinder is provided with a port 40, 41, and the ports are controlled by a valve 42, which may be of any suitable construction, and is operated by means of a lever 43, whose free end 44 extends to a point convenient for engagement by the gatherer as he places the charge through the opening 45. As shown, it is in position for engagement by the punty.

The valve 42 before mentioned operates a valve plug in a casing or cylinder 42ª, having removable heads 48 and 49, secured to the cylinder by screws 50. The lower head 49 is provided with an extended bearing or hub 51 through which slides a stem 52, and a packing 52ª is arranged in the bearing, the packing being secured in place by a packing nut 52ᵇ. The stem is provided with a head 53 for engaging the valve and the head 49 of the cylinder is recessed as at 54 to receive the head 50, so that when the stem is in its lowermost position the surface of the head is flush with the inner surface of the cylinder head.

The valve casing is provided with ports 55 and 56, and with an exhaust opening 57. The port 40 of the cylinder 15 connects with the port 55 of the casing by a pipe 40ª, from which branches 40ᵇ, 40ᶜ and 40ᵈ lead to the cylinders 140, 141 and 8 respectively, the cylinder 140 being connected with the blowing apparatus, the cylinder 141 with the mold clamping apparatus, and the cylinder 8 with the table rotating mechanism. The port 41 of the cylinder 15 is connected by a pipe 41ª with the port 56 of the valve casing and by branch pipes 41ᵇ, 41ᶜ and 41ᵈ with the cylinders 140, 141 and 8 respectively.

The valve plug 59 is provided with a groove 59ª which is adapted to connect the ports 55 or 56 with the exhaust port 57, depending upon the position of the plug, and the casing is provided with an inlet port 60 which is adapted to be connected with the port 56 by means of openings 62 and 63 in the casing and plug respectively, and with the port 55 when the plug is in lowered position. The stem 52 before mentioned is operated by means of an arm 64 adjustably secured on a rod or link 65 to be presently described, and the valve casing is secured to a standard 66 supported by the base 67 of the machine, to which base the spindle 1 is also connected by means of a split bearing 68.

The lever 43 before mentioned is pivoted to a bracket 69 extending from the valve casing 42, which is connected with the valve casing 42ª by a pipe 71 extending from the lower part thereof. The valve casing 42 is provided with an opening forming an outlet for the valve casing 42ª, but normally closed by a valve 72 whose stem projects through the casing and is in position for engagement by the lever 43, the valve being normally supported in closed position by the spring 73. The valve plug 59 is guided in its movement by a pin 74 arranged transversely of the valve casing and engaging a slot 75 in the plug.

It will be evident from the description, that when the lever 43 is depressed to open the valve 72, the plug 59 will drop, thus placing the inlet port of the valve casing in communication with the port 55, and through the pipe 40ª and its branches with the cylinders 15, 140, 141 and 8, thus operating the shears, raising the blow head releasing the mold clamping apparatus, and turning the table. At the same time the port 56 is in communication with the exhaust, thus exhausting the pipe 41ª and its branches. When the link 65 moves upward, the valve 59 will be lifted, thus admitting fluid to the opposite ends of the cylinders, whereby to open the shears, to lower the blow head, clamp the mold, and retract the table turning mechanism.

The link 65 before mentioned, has its lower end connected with the lever 76 pivoted as at 77 beneath the table, the central portion of the lever being connected with a rod 78 whose upper end engages one of a series of openings in the lower table, whereby to lock the table at the end of each intermittent movement. The upper end of the link is connected to one arm of an elbow lever 80, pivoted to a sleeve 81 on the standard 66, and the other arm of the elbow lever is engaged by a trip 82 on an arm 83 secured to the plunger stem 84. The trip 82 is mounted to yield on the downward movement of the arm and on the upward movement it operates the elbow lever to unlock the table, the link moving downward. A spring 85 is connected with the first named arm of the elbow lever for returning the lever to its original position, and it is upon the upward movement of the link that the valve plug 59 is lifted thus operating the cylinders as before mentioned.

In the operation of molding the glass, a plurality of bottoms is made use of for closing the lower end of the mold, the first or primary bottom being a plunger or blank mold 86, having projecting from the lower end thereof a stem 87. The primary bottom is used during the operation of the forming plunger 84, and is normally in lowered position, being elevated into position by a roller 88 on one end of an arm 89 pivoted to a standard 90 on the base, the other end of the arm being engaged by one end of a link 91 whose other end is connected with the arm 83 on the plunger stem, so that when the plunger is depressed the roller engages the stem of the primary bottom moving said bottom into place in which position it is retained by a bracket 92 movably connected to the sleeve 6 before mentioned. This mechanism however, forms no part of the invention for which reason it is not described more particularly. After the forming plunger moves out of the mold the primary bottom is permitted to drop, and the secondary or blow bottom is moved into place.

In Fig. 8, is shown in detail an improved mechanism for placing the secondary bottom in position which is operated by the dropping of the primary bottom. This mechanism comprises a lever 93 pivoted as at 94 on a bracket 95, which is secured to the molding machine, and whose one end 96 is in position for engagement by the stem of the primary bottom when the said bottom is permitted to drop. The other end has an opening therethrough, through which loosely passes a threaded rod 97, the other end of the rod being pivoted to the lateral arm 98 of a lever 99 having one end pivoted to the bracket 95 as at 100, and a collar 101 is adjustably mounted on the rod, between which and the end of the lever 93 is arranged a spring 102. Nuts 103 are threaded on to the lower end of the rod, the nuts and the collar forming an adjusting means for the spring and for the position of the lever 99.

To the free end of the lever 99 is pivoted by its center a bar 104 by a cap screw 105, and the lower end of the bar is engaged by a spring 106 whose other end is connected to the lever. The upper end of the bar is provided with a pin 108 which is adapted to catch and hold the outer end of an arm 109, for a purpose to be presently described, and the secondary bottom 110 is secured to the arm by means of screws 111. The arm is also provided with a knob 112 by means of which it may be moved out of position.

Arranged upon the table 2 and encircling the openings over which the mold is placed, is the mold plate 113, and the said plate is provided with a radial guideway 114, in which moves a lug 115 on the under surface of the secondary bottom, the lug guiding the bottom in its radial movement.

It will be evident from the description, that when the primary bottom is permitted to drop the stem thereof will engage the end 96 of the lever 93, thus elevating the other end thereof, and tilting the lever 99 on its pivotal connection 100 with the bracket. Such tilting movement is radial with respect to the table, and as described the secondary bottom is moved into position within the mold. Such movement, however, is a lagging movement considerably slower than the movement of the primary bottom or the movement of the lever 93, on account of the yielding connection between the lever 93 and the lever 99, and the amount of the lagging may be nicely adjusted by means of the nuts and the collar on the rod. The lever 99 returns to its original position by gravity, being heavier at 98.

The above described delayed movement insures the clearance of the primary bottom from the mold before the secondary bottom is moved into position. The pivotal connection of the bar with the lever 99 permits lateral movement of the arm with respect to the lever without disconnecting the parts, thus preventing breakage should the arm move laterally with respect to the lever.

As before mentioned, the pin 108 engages the outer end of the arm 109, and is not released until the table commences to turn. At this time the bottom is in position in the mold, and is partially rotated by the engagement of the pin, so that the lug 115 is thrown out of alinement with the radial guideway, thus preventing the bottom from moving outward of its own accord.

In Figs. 5, 6 and 7 is shown a timing device for regulating the moment when the forming plunger shall be withdrawn from the pressed article, such device comprising a cylinder 116, in which is movable a piston 117, the cylinder being provided with removable heads 118, through the upper of which passes the stem 119 of the piston, and the outer end thereof is connected with a cross head 120, having on one end thereof a cam 121, the other end being traversed by a rod 122, which is secured in place by nuts 123 and passes through bearings in lugs 124 extending from the heads of the cylinder, the lower ends of the rod being adapted for engagement by a bracket 125 secured to the forming plunger.

The cylinder is provided in its lower end with a port normally closed by a check-valve 126, and the port communicates with a cup 127 secured to the cylinder head, and the cup is connected by a pipe 128 with the upper end of the cylinder, and a storage tank 129 for a suitable fluid is connected by a pipe 130 with the cup 127 before mentioned. A scale 131 is secured to the upper end of the cylinder, and a pointer 132 coöperates with the scale, the pointer being secured as at 133 to the stem 134 of a valve 135, which controls a passage 136 leading directly from the lower end of the cylinder to the cup. By adjusting the pointer on the scale, the valve may be set to open any desired distance whereby to permit a greater or lesser flow of fluid.

When the plunger ascends, the bracket 125 engages the lower end of the rod 122, moving the same upward and with it the piston 117, as also the cam 121. Liquid flows from the storage tank into the cup, past the check valve and through the passage 136 into the lower end of the cylinder. When the forming plunger again descends, the liquid must be forced out through the passage 136, which is more or less closed by the movement of the pointer. The lever 137 which admits fluid to the lower end of the cylinder 138 that operates the forming plunger, is engaged by the cam 121 as the piston 117 is reaching the lower end of the cylinder and is moved by such cam whereby to operate the valve. It will be evident that by moving the pointer more or less to close the passage 136, the commencing of the rising movement of the plunger may be nicely calculated and adjusted. The crosshead 120 may be provided with an inclined cam as shown in Fig. 5, or may be of any other suitable shape or construction. The cylinder 116 is connected with the cylinder which operates the forming plunger by means of a suitable plate 140.

In operation, when a mold reaches charging position, the gatherer places a charge in the mold, at the same time touching the lever, which operates the shears, thereby cuts off the glass raises the blow head, unlocks the mold and admits air to the table turning cylinder and through the medium of the sleeve 6 turns the table. The table is at once partially rotated to bring the charge in the position for pressing. The pressing operation is continued a predetermined time accordingly as the pointer is adjusted with reference to the scale. When the piston reaches the lower end of the cylinder of the timing device, it shifts the valve which controls the forming plunger cylinder, the forming plunger is raised, and the primary bottom is permitted to drop, the dropping of the primary bottom as before described moving the secondary bottom in place, and when the lever 43 is again depressed the table is moved to blowing position. The next movement brings the mold to the discharging position, and the next to cooling position after which the operation is repeated.

The extent of movement of the lever 99 may be adjusted by means of disks 150 journaled eccentrically as at 151 between the bracket 95 and a plate 152, the pivots 151 of the disks being cap screws as shown. By loosening the cap screws the disks may be turned, and may be retained in their adjusted position by tightening the screws.

The valve plug is retained in its upper position, by means of the fluid pressure which leaks past the plug and fills the space therebelow, the plug being not a perfect fit in the casing. This pressure and the friction of the plug against the casing prevents its falling of its own weight. However, when the air is exhausted at 72 the pressure is then greater above than below and it is forced to the bottom of the casing.

It will be understood that the valve plug is pushed up by the upward movement of the link, and bracket attached thereto, through the medium of the small rod which passes through the lower head of the valve casing, and is held up by the said bracket, until the table is again unlocked and the link depressed. By this time enough air has escaped past the valve plug to the lower end of the casing to fill the space below the plug and the pipe leading to the small valve 42, the said valve being meanwhile closed with the same pressure of air as is above the plug. The friction of the plug against the casing holds it suspended until the air below the plug is permitted to escape through the valve 42, the said air escaping faster than it leaks past the plug, thus lowering the pressure or relieving the pressure beneath the plug and since the full pressure is above the plug, it is forced to the bottom of the casing.

I claim:

1. In a device of the class described, shears arranged above the mold when it is in charging position, said shears comprising a bracket provided with a guide plate, having an opening therethrough above the mold, pairs of strips arranged in parallel relation on each side of the opening, the inner adjacent corners of the members of the pairs being beveled, blade carriages having beveled edges engaging between the members of the pair, and arranged on each side of the opening, said carriages having depressions in the upper face thereof, blades in the depressions, a bar arranged transversely on each carriage and bearing on the blade, said bars having an upwardly projecting pin, levers pivoted to the bracket and having a forked end for engaging the adjacent pins, a cylinder with one of whose heads the bracket is connected, a piston movable in the cylinder and having a cross head connected with the free end of its rod, links pivoted to the cross head and to the levers, a valve for controlling the admission of fluid to the cylinder, and a lever for operating the valve, said lever extending above the shears in position for engagement by the punty when the charge is inserted in the mold.

2. In a machine of the class described, a mold, a forming plunger for coöperating with the mold, a cylinder, a piston within the cylinder and whose rod is connected with the forming plunger, a means for varying the duration of the stay of the plunger in the mold, said means comprising a cylinder, a reservoir for fluid communicating with the lower end thereof, a check valve arranged in the communication, a discharge opening leading from the lower end of the cylinder to the reservoir, a valve for controlling said opening, means for indicating the extent of opening of the valve, a piston movable in the cylinder, means operated by the upward movement of the forming plunger for lifting said piston, a valve for controlling the admission of fluid to the cylinder of the forming plunger for moving the same upward, and a cam connected with the piston rod of the said piston for operating said valve when the piston is in its lowest position.

3. In a machine of the class described, the combination with an intermittently rotating table provided with a plurality of molds, of a primary bottom for each mold, said bottom comprising a plunger having a downwardly projecting stem, a secondary bottom slidable radially of the table, a lever pivoted by its center and having one end in position for engagement by the stem of the plunger when the said plunger moves downwardly, an arm pivoted by one end and having a yielding connection with the secondary bottom for moving the same in position, and a yielding connection between said arm and the other end of the lever for the purpose set forth.

4. In a machine of the class described, a mold, a forming plunger for coöperating with the mold, fluid operated means for moving the former into and out of the mold, a valve for controlling said means, and a means for varying the duration of the stay of the plunger in the mold, said means comprising a cylinder, a piston therein, a reservoir for fluid communicating with the lower end of the cylinder, a check valve in the communication, means whereby the upward movement of the plunger will lift the piston and permit the fluid to enter the cylinder, an outlet for the fluid, means for restricting the outlet, means outside of the cylinder for indicating the extent of the restriction, and means in connection with the piston for operating the valve when the piston is in its lowest position.

5. In a machine of the class described, a mold, a forming plunger for coöperating with the mold, fluid operated means for moving the former into and out of the mold, a valve for controlling said means, and a means for varying the duration of the stay of the plunger in the mold, said means comprising a cylinder, a piston therein, a reservoir for fluid communicating with the lower end of the cylinder, a check valve in the communication, means whereby the upward movement of the plunger will lift the piston and permit the fluid to enter therein, an outlet for the fluid, means for restricting the outlet, and means in connection with the piston for operating the valve when the piston is in its lowest position.

6. In a machine of the class described, a mold, a forming plunger for coöperating therewith, fluid operated means for moving the plunger into and out of the mold, a valve for operating said means, and a means for varying the duration of the stay of the plunger in the mold, said means comprising a cylinder, a piston therein, means whereby the upward movement of the plunger will move the piston in one direction, means for permitting the free movement of the piston in one direction, and for restricting the movement of the piston in the other direction, and means whereby the piston will operate the valve at the conclusion of its movement in the last named direction.

7. In a machine of the class described, a mold, a forming plunger for coöperating therewith, fluid operated means for moving the plunger into and out of the mold, a valve for operating said means, and a means for varying the duration of the stay of the plunger in the mold, said means comprising a gravity operated plunger for opening the valve, a fluid check for restraining the movement of the plunger, and means for adjusting the check whereby to vary the speed of the plunger.

8. In a machine of the class described, a mold, a forming plunger for coöperating therewith, fluid operated means for moving the plunger into and out of the mold, a valve for operating said means, and a means for varying the duration of the stay of the plunger in the mold, said means comprising a gravity operated plunger for opening the valve, and a fluid check for restraining the operation of the plunger.

9. In a machine of the class described, the combination with an intermittently rotatable table having a plurality of bottomless molds, of vertically movable plungers forming primary bottoms for the molds, means for supporting the plungers in the molds, during the operation of the forming plunger, and for releasing them at the end of the operation, secondary bottoms movable radially of the table into the molds, a lever pivoted by one end and provided with a lateral arm, a bar pivoted by its center to the free end of the lever, and swinging in the direction of movement of the table, a spring normally retaining the bar in alinement with the lever, said bar having means for engaging the secondary bottom and moving it into place when the lever is swung, a second lever pivoted by its center and having one end in position for engagement by a primary bottom when released, a rod pivoted to the lateral arm of the first lever and traversing an opening in the other end of the second lever, a collar threaded on to the rod between the arm and the lever, a spring between the collar and the lever, and nuts on the rod below the lever.

10. In a machine of the class described, the combination with an intermittently rotatable table having a plurality of bottomless molds, of vertically movable plungers forming primary bottoms for the molds, means for supporting the plungers in the mold during the operation of the forming plunger, and for releasing them at the end of the operation, secondary bottoms movable radially of the table into the molds, a lever pivoted by one end and provided with a lateral arm, a bar pivoted by its center to the free end of the lever and swinging in the direction of movement of the table, a spring normally retaining the bar in alinement with the lever, said bar having means for engaging the secondary bottom and moving it into place when the lever is swung, a second lever pivoted by its center and having one end in position for engagement by a primary bottom when released, and a yielding connection between the other end of the lever and the lateral arm.

11. In a machine of the class described, the combination with an intermittently rotatable table having a plurality of bottomless molds, of vertically movable plungers forming primary bottoms for the molds, means for supporting the plungers in the mold during the operation of the forming plunger, and for releasing them at the end of the operation, secondary bottoms movable radially of the table into the molds, a pivotally mounted lever having one end in position for engagement by a primary bottom when released, a swinging lever for engaging and moving a secondary bottom into place, and a yielding connection between the levers.

12. In a machine of the class described, the combination with an intermittently rotatable table having a plurality of molds, of a vertically movable primary bottom for each mold, means for supporting said bottom during the operation of the forming plunger, and for releasing said bottom at the end of such operation, a secondary bottom movable radially of the table, means operated by the dropping of the primary bottom for moving the secondary bottom into position, and means in connection with said means for delaying said movement.

13. In a machine of the class described, the combination with an intermittently rotatable table provided with spaced molds, of fluid operated shears arranged at the charging position of the molds, a fluid operated forming plunger for coöperating with the molds, primary bottoms for the molds during the operation of the forming plunger, means for supporting said bottoms during the operation of the forming plunger and for releasing them at the end of the operation, secondary bottoms, means whereby the releasing of the primary bottoms will move the secondary bottoms into position, and means in connection with said means for delaying the movement of the secondary bottom.

14. In a machine of the class described, the combination with an intermittently rotatable table provided with spaced molds, of fluid operated shears arranged at the charging position of the molds, a fluid operated forming plunger for coöperating with the molds, primary bottoms for the molds during the operation of the forming plunger, means for supporting said bottoms during the operation of the forming plunger and for releasing them at the end of the operation, secondary bottoms, and means whereby the releasing of the primary bottom will move the secondary bottom into position.

WILLIAM J. MILLER.

Witnesses:
  GEO. J. MAGLY,
  PETER J. MAGLY.